US006785587B2

(12) United States Patent
Agne

(10) Patent No.: US 6,785,587 B2
(45) Date of Patent: Aug. 31, 2004

(54) CONTROL METHOD AND CONTROL DEVICE FOR THE OPERATION OF COUPLED DRIVE AXES WITH SUPERPOSED MOVEMENT COMPONENTS

(75) Inventor: Werner Agne, Röthenbach (DE)

(73) Assignee: Siemens Aktiengesellschaft, Munich (DE)

( * ) Notice: Subject to any disclaimer, the term of this patent is extended or adjusted under 35 U.S.C. 154(b) by 228 days.

(21) Appl. No.: 10/056,904

(22) Filed: Nov. 13, 2001

(65) Prior Publication Data

US 2003/0005837 A1 Jan. 9, 2003

(30) Foreign Application Priority Data

Jul. 6, 2001 (DE) ........................................ 101 32 807

(51) Int. Cl.[7] ................................................ G06F 19/00

(52) U.S. Cl. .......................... 700/193; 700/54; 700/56; 700/61; 700/71; 700/177; 700/186; 318/560

(58) Field of Search ............................ 700/19, 46, 54, 700/56, 61, 63, 75, 78, 177, 186, 193, 71; 101/225; 318/560, 590

(56) References Cited

U.S. PATENT DOCUMENTS 4,442,389 A * 4/1984 Sawada et al. ............. 318/642
4,708,544 A * 11/1987 Faulstich et al. ............. 409/12
4,860,634 A * 8/1989 Hein ........................ 91/363 R
5,093,773 A * 3/1992 Blevins ...................... 700/128
5,097,193 A * 3/1992 Neis et al. .................. 318/800
5,886,491 A * 3/1999 Yoshida et al. ............. 318/592
6,204,622 B1 * 3/2001 Tsuruta ....................... 318/609
2001/0002097 A1 * 5/2001 Tsutsui ....................... 318/560
2001/0052517 A1 * 12/2001 Nakagawa et al. ......... 219/502

FOREIGN PATENT DOCUMENTS

| | | |
|---|---|---|
| DE | 2747022 | 10/1977 |
| DE | 19623223 | 11/1996 |
| DE | 19723043 | 6/1997 |
| DE | 10125609 | 5/2001 |
| WO | 9711848 | 4/1997 |

* cited by examiner

*Primary Examiner*—Anthony Knight
*Assistant Examiner*—Crystal J. Barnes
(74) *Attorney, Agent, or Firm*—Baker Botts L.L.P.

(57) ABSTRACT

The invention relates to a control method and a control device for the operation of rotationally or linearly driven axes with a position control. This involves determining the difference between the setpoint position value (LS) and actual position value (WI) caused by an additional movement component during the time period of the occurrence of at least one superposed movement by subtraction of one value from the other. Furthermore, it is possible to eliminate movement components which are known, periodic and can be mathematically determined as desired from all the required control data paths during the time period of the superposed movement.

11 Claims, 2 Drawing Sheets

CONTROL METHOD AND CONTROL DEVICE FOR THE OPERATION OF COUPLED DRIVE AXES WITH SUPERPOSED MOVEMENT COMPONENTS

FIELD OF THE INVENTION

The invention relates to a control method and a control device for the operation of rotationally or linearly driven axes with a position control.

BACKGROUND OF THE INVENTION

If, in addition to its drive movement, a rotationally or linearly driven axis is swiveled or moved onto a path or position, it performs an additional superposed movement. In the case of printing machines, for example, pressure rollers are pressed onto or lifted off a paper web. This is referred to as "pressure on" or "pressure off". In this case, a drive experiences an additional turning motion in relation to its reference system. A measuring system, such as a rotary encoder, measures the movements in relation to the housing. This superposed movement is usually registered by an additional measuring system and fed to a control in order to compensate for the superposed movement. If this does not take place, it is possible in the case of the printing machine for tearing of the paper web to occur and consequently for there to be a breakdown of a production machine or production process.

The situation explained using the printing machine as an example is applicable to other production machines, machine tools or robots (hereinafter "machines"). Hence a movement additionally superposed in relation to the reference system can lead to a control error, which while compensated by a control device, may be undesired in the production process. Furthermore, an additional measuring system is required to register the superposed movement.

German patent application Number 101 256 09.4 has proposed a control method for the operation of individually driven rotating machine elements with an angular position control, which are coupled with frictional connection or via a common load. In this case, boundary-describing parameters of the driven, corresponding machine elements in the form of an angular position deviation are fed as a correcting quantity to the input of the angular position controller. This method does not make it possible to determine superposed movement components and remove them from the control information.

A rotary printing machine is described in the international application WO 97/11848. This generally comprises a plurality of producing units, known as rotary presses, which can operate simultaneously and independently of one another. Each producing unit comprises, inter alia roll carriers for the paper rolls, draw rollers for drawing the paper web in and out of the printing towers, printing stations, which operate in combination as U, Y or H printing units in one or more printing towers, auxiliary drives at the printing stations and the folder.

SUMMARY OF THE INVENTION

The object of the present invention is to determine specific, superposed movement components, the beginning and end of which are defined in terms of when they occur, from control or process information of rotationally or linearly driven axes without the need for additionally installed measuring systems, and eliminating the superposed movement components from the control. According to the present invention, this object is achieved by providing at least one setpoint position value and at least one actual position value of an axis or component to be controlled, and determining the difference between the setpoint position value and actual position value caused by an additional movement component during the time period of the occurrence of at least one superposed movement by subtraction of one value from the other, and with the additional movement component being eliminated from all the required control data paths. Accordingly, this control method advantageously makes it possible to (a) determine a superposed movement component during a known period of occurrence from the setpoint position value and the actual value, without additionally installed measuring systems, and (b) to remove it from the control or process information.

A preferred embodiment of the present invention is characterized in that a movement component known from the sequence of movements in the control is eliminated from all the required control data paths. Consequently, it is no longer necessary for the sequence of movements first to be determined and then to eliminate it from the required control data paths, relying instead on a known sequence of movements, which if need be may be stored in the control. It is also conceivable for this stored sequence of movements to be provided by an additional storage medium.

Another preferred embodiment of the present invention is characterized in that the known movement component occurs periodically during the time period of the superposed movement. In accordance with this method, it is only necessary to store one period of the known movement component.

Yet another preferred embodiment of the present invention is characterized in that a movement component which can be mathematically defined as desired is eliminated from all the required control data paths. As a result, it is possible for example to eliminate mean values of movement components or mathematical approximations of known sequences of movements from the control data paths.

In another preferred embodiment of the present invention at least one superposed movement component is eliminated from all the required control data paths using the aforesaid method and a position deviation is formed from the setpoint position value and actual position value, which is fed to a position controller; a rotational speed deviation is formed from a setpoint rotational speed and actual rotational speed, which is fed to a speed controller; a current deviation is formed from a setpoint current value and actual current value, which is fed to a current controller, with a torque to be required from the current controller being fed to an axis drive.

The present invention may be used in the case of a machine tool, production machine or a robot to eliminate a superposed movement component from the control data paths. In particular, where the production machine is a printing machine where a high-quality printed image is required, a swiveling movement of pressure rollers, as performed in the case of the "pressure on" and "pressure off" command, has the effect that an additional movement component is contained in the axis drive of the pressure roller. This is compensated by the drive control, which is usually operated with a position control. This may lead to tearing of the paper web and a breakdown of the printing machine or the entire printing process. Furthermore, registration of superposed movement components is made possible without additional measuring systems. This allows cost savings to be realized.

BRIEF DESCRIPTION OF THE DRAWINGS

The present invention is explained in greater detail in connection with an exemplary embodiment and the drawings, in which.

DETAILED DESCRIPTION OF THE INVENTION

Figure 1:
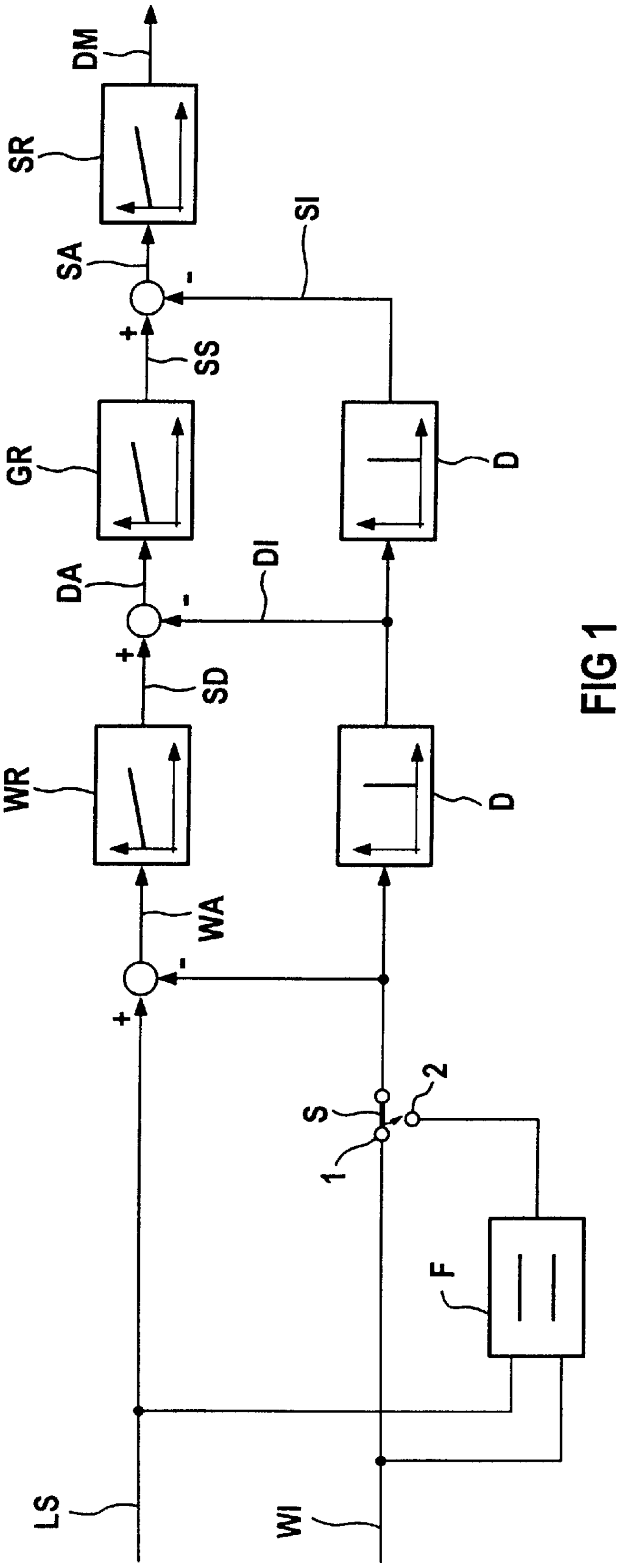
FIG. 1 shows a control block diagram for the operation of rotationally or linearly driven axes with an additional movement compensation.

FIG. 1 illustrates a control block diagram for the operation of rotationally or linearly driven axes. In this case, a setpoint position value LS is predetermined by a higher-level open-loop or closed-loop control, not represented for the sake of simplicity. If switch S is in the switch position 1, the actual position value WI is subtracted from the setpoint position value LS and leads to a resultant position deviation WA. This is an input parameter of a position controller WR, which determines a setpoint rotational speed SD. A rotational speed deviation DA then results from the setpoint rotational speed SD minus the actual rotational speed value DI. This is determined by differentiation of the actual value WI in the differentiating block D.

The rotational speed deviation DA is fed to a speed controller GR, which for this purpose outputs a setpoint current SS. An actual current value SI of the drive is subtracted from this, so that a current controller SR can use the resultant current deviation SA to determine a torque DM. The actual current value SI is determined by differentiation of the actual rotational speed value DI by a differentiating block D.

The torque DM is transmitted to an associated drive converter. The actual current value information SI, which in many cases is determined inside the device as the converter output current, is often transferred by the converter itself. Furthermore, it is also possible for the derivative with respect to time of the actual position value WI to be obtained already in a sensor evaluation and fed to the drive controller. This makes it possible to dispense with the differentiating blocks D in the drive controller. The respective provision of information is in this case undertaken by a sensor and/or a converter.

In FIG. 1, all the data paths are represented as arrow connections. If data are added or subtracted outside the control blocks, this is represented by a plus sign (+) or a minus sign (–) in the vicinity of a circle at which the arrow tips meet. All the individual block diagrams are represented as rectangles. The control block diagrams WR, GR and SR show a symbolically represented graph. The block diagram F has two horizontal bars inside the rectangle to indicate computing operations. The differentiating control block D is symbolically depicted as an XY diagram with a vertical line.

The switch S is brought into the switch position 2, depicted by broken lines, during the time period of the occurrence of at least one superposed movement. In this case, the actual position value information WI is no longer passed on directly, but instead the result of the filter block F is used for further computation. The filter block F determines during the time period of the occurrence of at least one superposed movement a superposed movement component from the setpoint position value information LS and the actual position value WI and eliminates it from the actual position value. For this purpose, the setpoint position value LS is subtracted from the actual position value WI. During the time period of the superposed movement, the result represents the superposed movement component itself. The value of this component is then subtracted from the actual position value and fed as the result of the filter block F to the switch S.

During the time period of the occurrence of at least one superposed movement, it is assumed that there is no position deviation WA. Once the superposed movement has ended, the switch S is brought from the switch position 2 into the switch position 1 and the control information is fed as described, to the individual control blocks.

It is also possible for movement components which are known and stored in the filter block F to be subtracted from the setpoint position value LS. If the known movement component occurs periodically, only one period has to be stored in the system. This is periodically subtracted from the actual position value WI.

Figure 2:
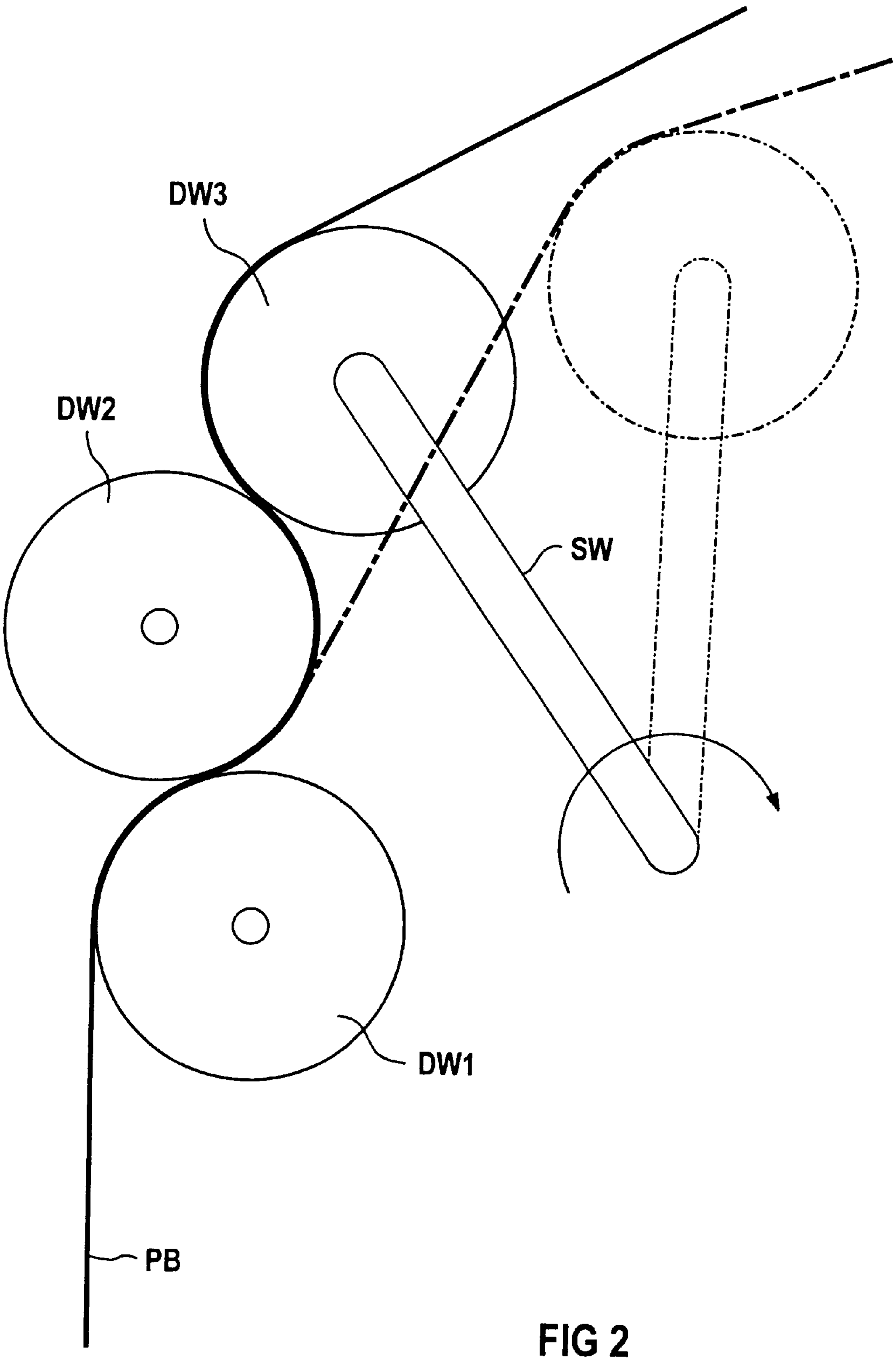
FIG. 2 shows a basic representation of individually driven pressure rollers of a printing machine.

FIG. 2 illustrates a basic representation of pressure rollers DW1–DW3 of a printing machine. In this case, a paper web PB runs over the pressure rollers DW1–DW3. A swivel arm SW presses the paper web PB via the pressure roller DW3 onto the pressure roller DW2. This takes place in the case of the "pressure on" command. If the "pressure off" command is given, the position of the swivel arm SW and of the pressure roller DW3 depicted by broken lines is adopted. In this case, the paper web PB is no longer pressed via the pressure roller DW3 onto the pressure roller DW2.

During the time period which the swivel arm SW needs to move from one position to the other, the drive controller has an additional movement component in the actual value information WI. This leads to an additional position deviation WA, for which the drive controller attempts to compensate. To avoid this and consequently possible tearing of the paper web PB, the control method described above is used. As a result, it is not necessary to install in the printing machine an additional sensor which determines the movement component and consequently costs can be saved.

I claim:

1. A control method for the operation of a machine having driven components and a position control, comprising the steps of:

- detecting whether at least one superposed movement component is present;
- providing at least one setpoint position value and at least one actual position value of a component to be controlled;
- only during the presence of the superimposed movement, correcting the actual position value by eliminating an additional movement component from the actual position value;
- determining the difference between the setpoint position value and actual position value.

2. The method according to claim 1, wherein the additional movement component is a movement component known from a sequence of movements in the control.

3. The method according to claim 2, wherein the known movement component occurs periodically during a time period of the superposed movement.

4. The method according to claim 2, wherein the additional movement component is a movement component which can be mathematically defined as desired.

5. The method according to claim 1, wherein the additional movement component is determined by subtracting the setpoint position value from the actual position value.

6. The method according to claim 1, utilized in a machine selected from the group consisting of a machine tool, production machine and robot.

7. The method according to claim 6, wherein the production machine is a printing machine.

8. A device for controlling the operation of a machine having driven components, comprising:

a position controller receiving a setpoint position value and a second position value wherein the position controller comprises a subtractor subtracting said second position value from said setpoint position value; and a switch receiving an actual position value and a corrected position value and providing said actual position value or said corrected position value as the second position value for said position controller, wherein said corrected position value is the actual position value corrected by eliminating an additional movement value which is included in the actual position value during an occurrence of at least one superposed movement; wherein the switch is controlled to output during the occurrence of the at least one superimposed movement the corrected position value and otherwise the actual position value.

9. The device according to claim 8, further comprising a filter for providing said corrected position value, said filter receiving said setpoint position value and said actual position value.

10. The device according to claim 9, wherein the filter generates said additional movement value by subtracting said setpoint position value from said actual position value.

11. The device according to claim 8, wherein the position controller further comprises wherein a speed controller to which a rotational speed deviation, formed from a setpoint rotational speed and actual rotational speed can be fed; a current controller to which a current deviation, formed from a setpoint current value and actual current value can be fed; and wherein a torque to be required from the current controller is fed to a component.

* * * * *